(12) United States Patent
Brown et al.

(10) Patent No.: US 7,646,860 B2
(45) Date of Patent: Jan. 12, 2010

(54) ENHANCED PRIVATE CALL SCREENING

(75) Inventors: Randall L. Brown, Phoenix, AZ (US);
Nicholas Michael DeVito, Naperville, IL (US); Gregory P. Gibson, Cave Creek, AZ (US); Amit A. Patel, Bloomingdale, IL (US); Tushar Ramesh Shah, Lombard, IL (US); Douglas William Varney, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 940 days.

(21) Appl. No.: 11/137,907

(22) Filed: May 26, 2005

(65) Prior Publication Data
US 2006/0285669 A1 Dec. 21, 2006

(51) Int. Cl.
*H04M 3/42* (2006.01)
*H04M 1/56* (2006.01)
*H04M 15/06* (2006.01)

(52) U.S. Cl. .................. 379/201.11; 379/142.01; 379/142.02; 379/142.04; 379/210.03; 379/211.01

(58) Field of Classification Search ........... 379/201.01, 379/88.19, 210.01, 142.02, 88.21, 88.14, 379/142.01, 142.04, 88.2, 207.15, 201.07, 379/210.02, 201.11
See application file for complete search history.

(56) References Cited

U.S. PATENT DOCUMENTS

| | | | | |
|---|---|---|---|---|
| 5,625,676 | A * | 4/1997 | Greco et al. | 379/88.14 |
| 5,832,060 | A * | 11/1998 | Corlett et al. | 379/88.19 |
| 6,738,461 | B2 * | 5/2004 | Trandal et al. | 379/142.02 |
| 2004/0190703 | A1 * | 9/2004 | Trandal et al. | 379/210.01 |
| 2007/0201638 | A1 * | 8/2007 | Latter et al. | 379/88.21 |

* cited by examiner

*Primary Examiner*—Thjuan K Addy
(74) *Attorney, Agent, or Firm*—Werner Ulrich

(57) ABSTRACT

A method and apparatus for identifying a caller who does not provide caller identification on an unanswered call. The caller is asked to record his/her name (or some other characteristic utterance). If the call is unanswered, the record is retained and can be accessed by the called party when that party requests his/her stored voice mail. Advantageously, even on unanswered calls, the identity of the caller can be presented to the called party when that called party requests stored voice mail messages, even if the calling party has private service.

5 Claims, 5 Drawing Sheets

ENHANCED PRIVATE CALL SCREENING

TECHNICAL FIELD

This invention relates to services for permitting a caller to avoid revealing his/her telephone number but conveying his/her identity to a called party.

BACKGROUND OF THE INVENTION

A very popular service in the field of telecommunications is a form of private call screening. With this service, a caller who wishes to avoid transmitting his/her telephone number via incoming caller line identification (ICLID) can still convey his/her identity to a called party. In the most common arrangement, the caller records his/her name or some other characteristic utterance and that recorded name or utterance is revealed to the called party in order to allow that party to make a decision as to whether or not to accept the call. The service is used for customers who do not wish to automatically accept calls from callers whose identity has been suppressed. Callers may suppress their identity by having a class of service in which this is done or by dialing a prefix such as *67 to suppress the identity on a particular call. The object is to control communications with a possible harasser without revealing a return telephone number and to keep the telephone number secret from benign parties who may be careless in revealing that number. In some applications, when the called party is unavailable, voice messaging is suppressed unless the revealed identity of the caller is on a list of the called party.

While the service performs a very useful function, as shown by its popularity, the usefulness of the function is still open to improvement.

SUMMARY OF THE INVENTION

Applicants have carefully studied the characteristics of present privacy management systems and have recognized that while these systems are useful in performing their service when the called party is available to take calls, they fail to provide adequate information about calls received when the called party is not available. This leaves the caller with the unhappy choice of trying repeatedly to call the called party until the called party becomes available or to forget about the subject of the call.

In accordance with Applicants' invention, this dilemma is resolved and an advance is made over the teachings of the prior art in a system wherein the recorded spoken name of the called party, recorded even when the called party is not available, is retained in a file of calls received by the called party when the called party was not available and which file can be called up by the called party who can then hear the spoken name recorded for the call. Advantageously, this permits a called party to identify calls that were not completed because the called party was unavailable from callers whose caller identification is not received with the call or who are not on the called party's accept list.

In accordance with one feature of Applicants' invention, the file of calls, including a digitized version of the caller's spoken name, is accessible from any location via the Internet. Advantageously, this permits a called party to obtain information about callers unwilling to reveal their telephone number or whose number is not on an accept list of the called party whose calls were not completed because the called party was not available. This is particularly helpful to the called party when he or she is browsing the call logs and helps in deciding whether to listen to the full message or to skip the message. In addition, this capability can be also used by Unified Voice Messaging system to play the caller's spoken name when the called party is listening to the messages using the Telephony User Interface instead of the Web based User Interface. This feature can be used in conjunction with a feature, such as automatic callback (*69 in the U.S.) which allows a callback to a caller whose telephone number is not known to the called party.

More generally, if for any reason, such as a received calling number not matching one of a group of acceptable numbers, a call is first routed to a system for recording a spoken utterance, and the call is subsequently routed to a voice mail system, the recorded utterance is stored in the voice mail system and is available for subsequent retrieval by the called party. Advantageously, this permits the called party to screen recorded incoming calls and to discard unwanted calls without listening to them.

BRIEF DESCRIPTION OF THE DRAWING(S)

DETAILED DESCRIPTION

Figure 1:
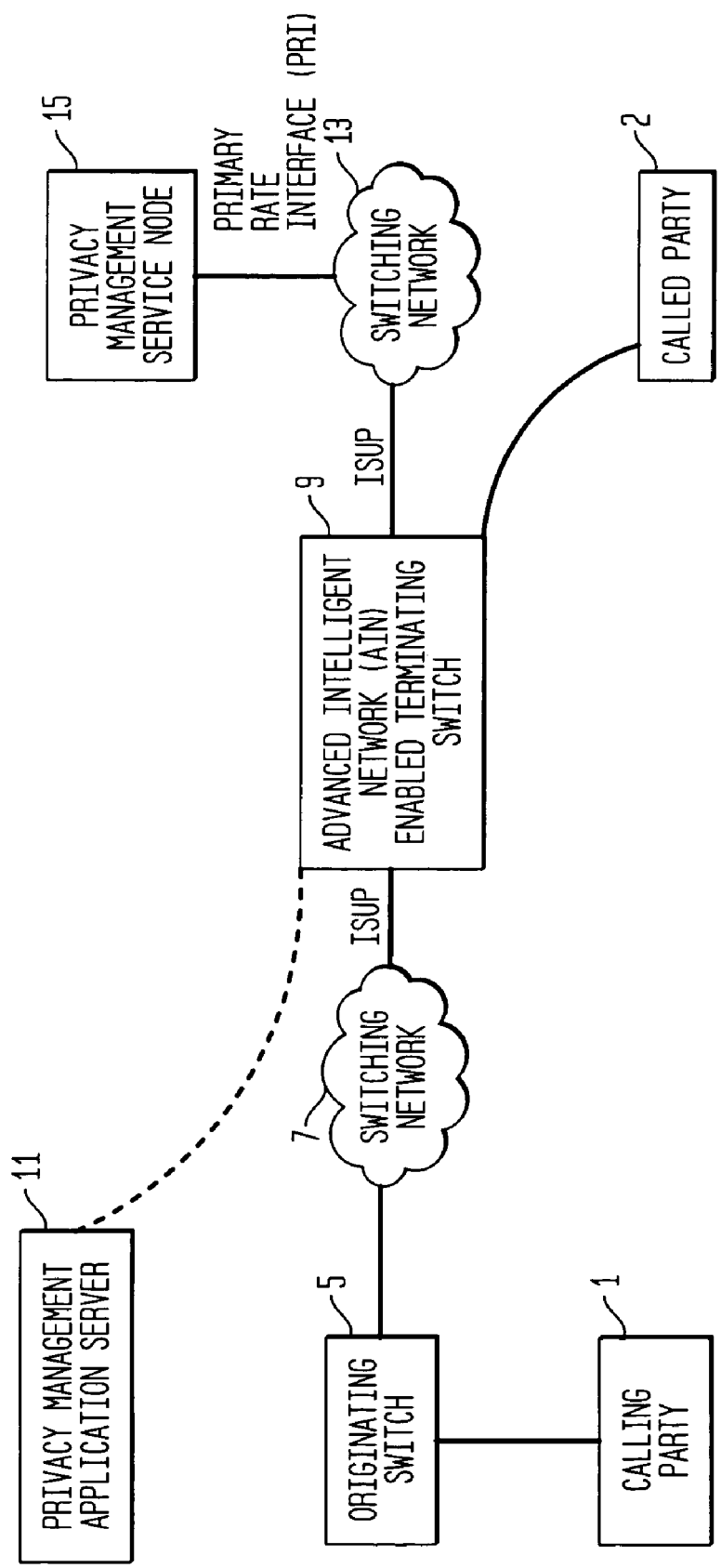
FIG. 1 is a diagram illustrating a prior art privacy management system.

FIG. 1 is a block diagram of a prior art privacy management system. A calling party 1 calls a called party 2. The privacy management system is involved primarily for cases in which the caller has suppressed the transmission of his/her identity to the called party. The calling party is connected to an originating switch 5 which accesses a switching network 7 in order to access an advanced intelligent network (AIN) enabled terminating switch 9. This terminating switch, in response to receipt of the called number and in the absence of receipt of a calling number identification, checks its database to determine whether an access to a privacy management application server 11 responsible for privacy management functions should be accessed. If so, the terminating switch 9 queries the privacy management application server 11. If the called customer has privacy management service and the calling number is private, i.e., not provided to the called party, then the privacy management application server 11 returns a response to terminating switch 9 requesting that the call be routed to a privacy management service node 15. The call is so routed over switching network 13 and the privacy management service node 15 then asks the caller to speak his/her name so that the called party can subsequently make a decision whether or not to accept the call. After the called party has provided his/her name the privacy management service node 15 is connected through switching network 13 to the called party 2. The called party is then informed that a call has been received from a caller identified by the spoken name. The called party can then signal to accept the call or reject the call. If the called party signals to accept the call then a connection is made from the calling party via terminating switch 9 to the called party.

Figure 2:
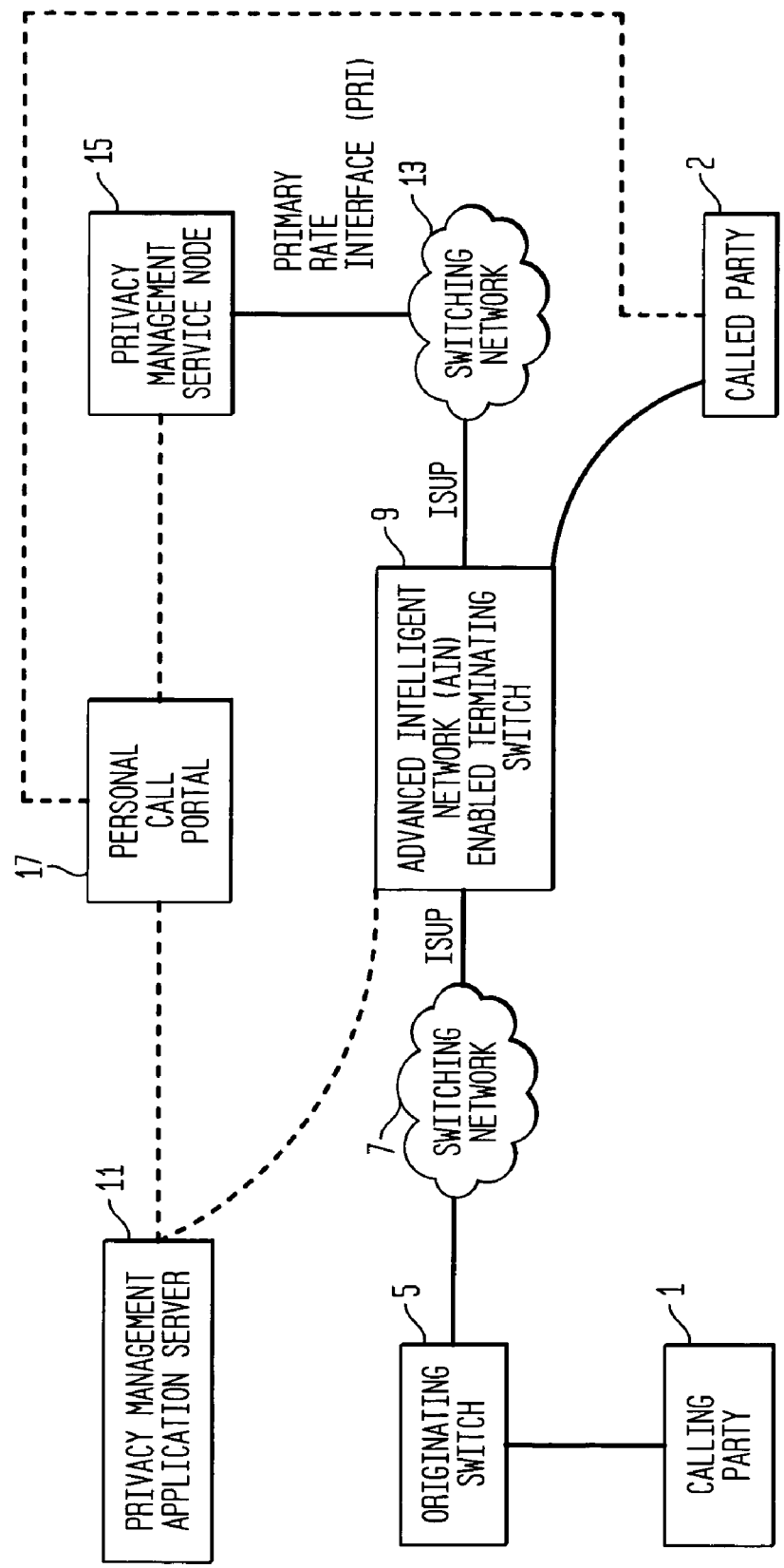
FIG. 2 is a block diagram illustrating the Applicants' invention.

FIG. 2 includes all the elements of FIG. 1 with the addition of a personal call portal 17 connected to the privacy management application server and the privacy management service node. The personal call portal 17 is a database used to store and present (either by visual or audio means) information about calls to called parties who have subscribed to an appropriate service. When the privacy management service node receives the spoken name of a call, the privacy management service node transmits this spoken name as a digitized file to the personal call portal. The called party 2 can then access the personal call portal to retrieve information about either all calls or calls which were received while the called party was unavailable or all calls which were blocked because of the absence of a caller identification. The called party can access data in the personal call portal either through the network via the privacy management service node or (not shown) via the Internet. If the called party either only has a simple plain old telephone service (POTS) telephone station, then the called party can access data in the personal call portal 17 if that personal call portal has a telephony interface as well as a data interface. In that case, switching network 13 would have a voice connection to a voice port on the personal call portal.

More generally, if for any reason, such as a received calling number not matching one of a group of acceptable numbers, a call is first routed to a system for recording a spoken utterance, and the call is subsequently routed to a voice mail system, the recorded utterance is stored in the voice mail system and is available for subsequent retrieval by the called party. Advantageously, this permits the called party to screen recorded incoming calls and to discard unwanted calls without listening to them.

Figure 3:
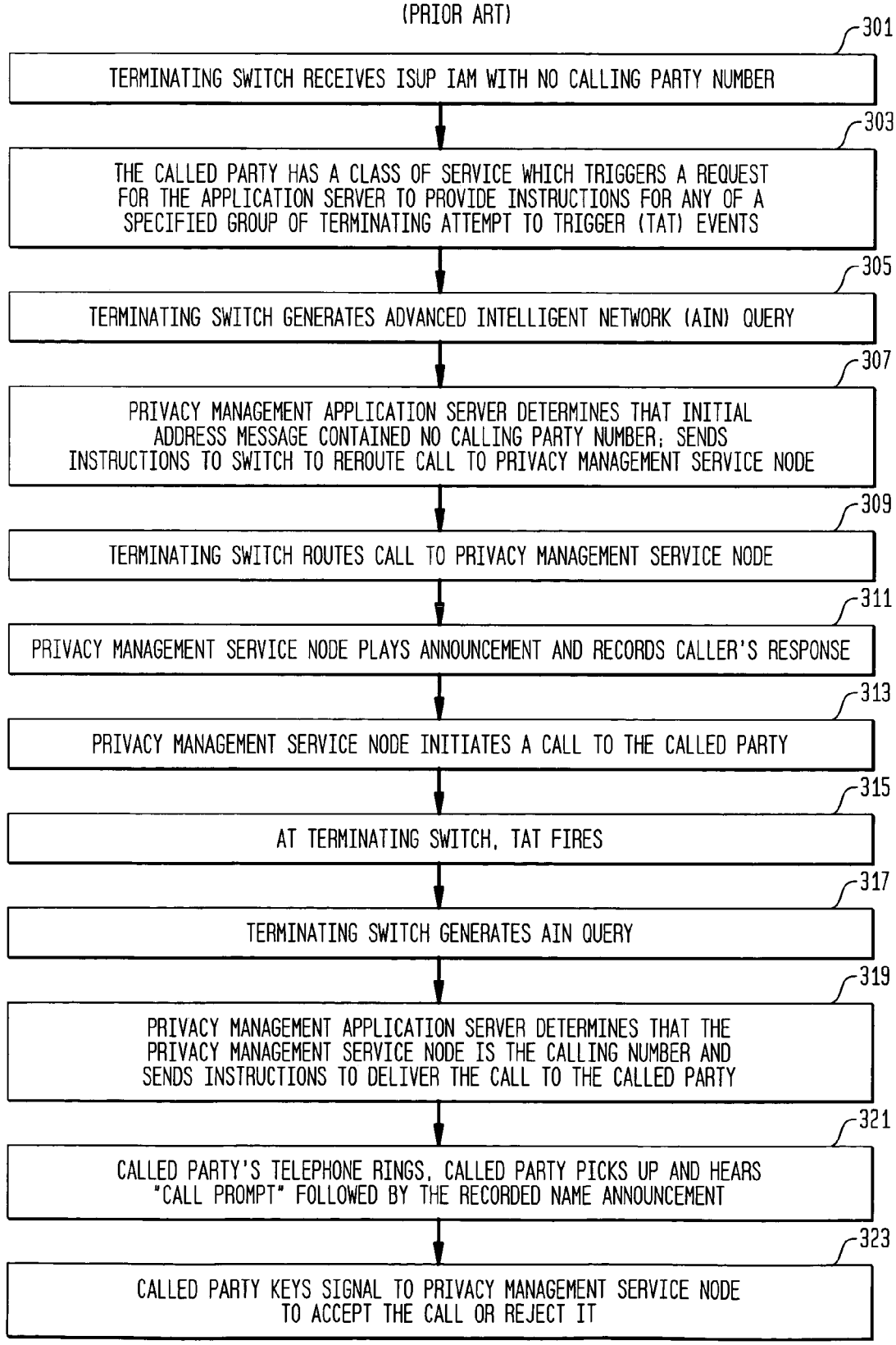
FIG. 3 is a flow diagram illustrating the operation of a prior art privacy management system.

FIG. 3 is a flow chart illustrating the operation of a prior art privacy management system. A terminating switch such as switch 9, receives a call setup message, such as the ISUP initial address message (IAM), which is missing the calling party number (action block 301). This message is recognized in the terminating switch as a terminating attempt to trigger (TAT) which asks the terminating switch to obtain instructions from a service control point, in this case, the privacy management application server 11 (action block 303). The terminating switch generates an advanced intelligent network (AIN) query to the application server (action block 305). The application server determines that the IAM did not contain a calling party number and sends instructions to the terminating switch to reroute the call to a privacy management service node (action block 307). The terminating switch routes the call to a privacy management service node such as node 15 (action block 309). The privacy management service node plays an announcement, such as "Please say your name" to the calling party and records the caller's response (action block 311). The privacy management service node then initiates a call to the subscriber's telephone number as originally received in the initial address message (action block 313). At the terminating switch, the same trigger is recognized for this call to the called party (action block 315). The terminating switch generates an Advanced Intelligent Network AIN) query to the privacy management application server (action block 317). The application server determines that for this connection the calling number is that of the privacy management service node and sends instructions to deliver the call to the called party (action block 319). The called party's telephone rings and if the called party picks up he/she hears "call from" followed by the recorded name announcement (action block 321). The subscriber can then accept the call or reject it by sending a signal, such as a dual tone multifrequency (DTMF) key signal, to the service node to initiate actions for accepting the call by completing it or rejecting it by returning some appropriate announcement to the calling party (action block 323).

Figure 4:
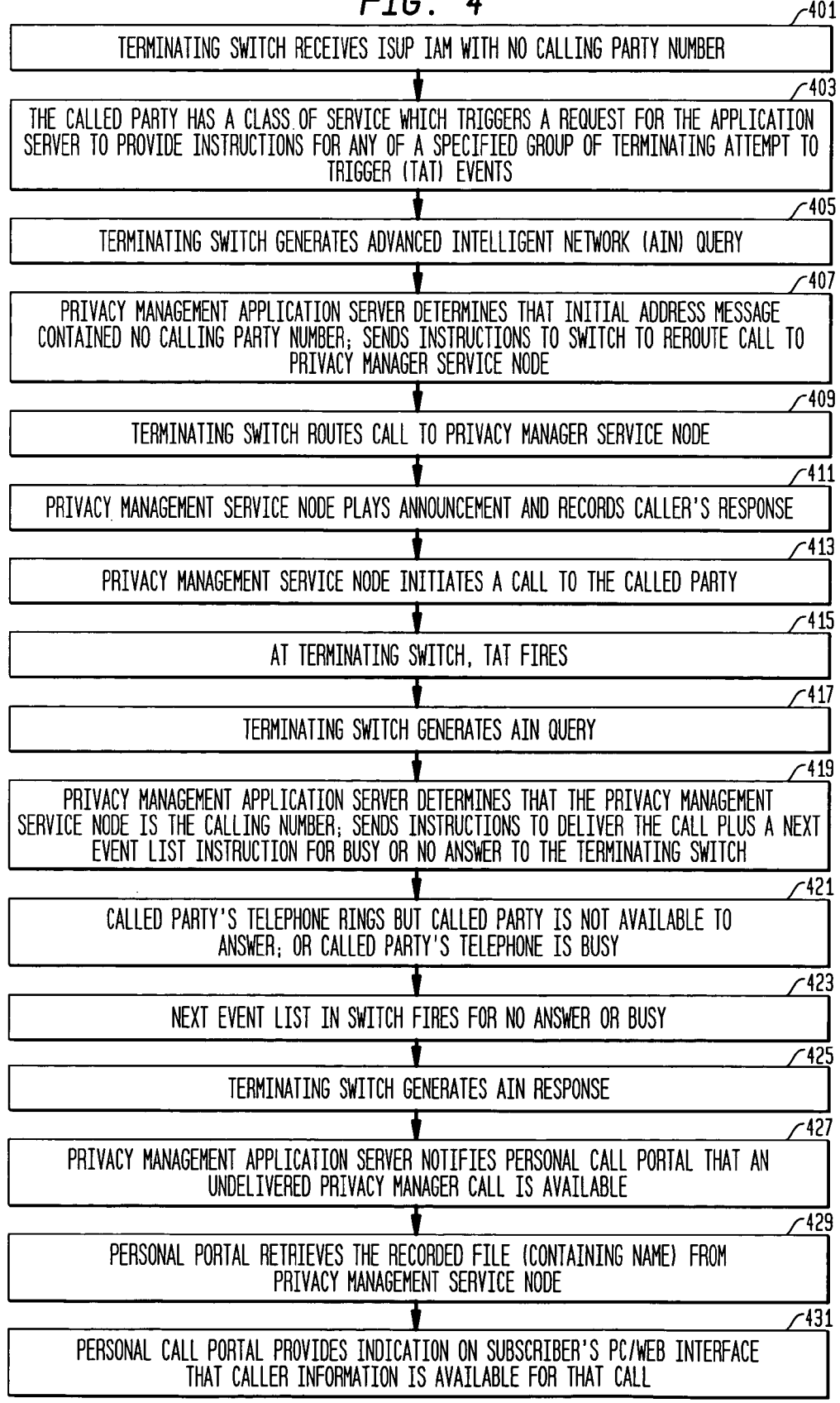
FIG. 4 is a flow diagram illustrating the operation of Applicants' invention.

FIG. 4 is a flow diagram illustrating the operation of enhanced privacy management. The steps 401-417 are the same as the steps 301-317 of the prior art.

After step 417, the application server determines that the privacy management service node is the calling number and sends instructions to deliver the call plus a next event list instruction for a busy or no answer condition (action block 419). (In case of answer the actions of steps 319, 321 and 323 (not shown here) are executed). The terminating customer's telephone rings but the terminating customer is not available to answer or the telephone is busy (action block 421). The next event list in the terminating switch fires for the no answer condition (action block 423). The terminating switch generates an AIN response (action block 425). The application server which received the query notifies a personal call portal unit that an undelivered privacy management call is available (action block 427). The personal call portal retrieves the recorded file containing the name from the privacy management service node (action block 429). The personal call portal provides an indication on the subscriber's personal computer/web interface that caller information is available for that call (action block 431). When called subscriber clicks on that information, the recorded name is played and the subscriber can decide whether or not to return a call to the caller identified by the recorded name.

In order to allow a call from a party having a private number to be returned, the private number can be retained along with the spoken utterance. The called party can then signal the switch to call the calling party using this stored private number, in much the same way as automatic callback, without revealing the stored private number to the called party.

More generally, if for any reason, such as a received calling number not matching one of a group of acceptable numbers, a call is first routed to a system for recording a spoken utterance, and the call is subsequently routed to a voice mail system, the recorded utterance is stored in the voice mail system and is available for subsequent retrieval by the called party. Advantageously, this permits the called party to screen recorded incoming calls and to discard unwanted calls without listening to them.

Figure 5:
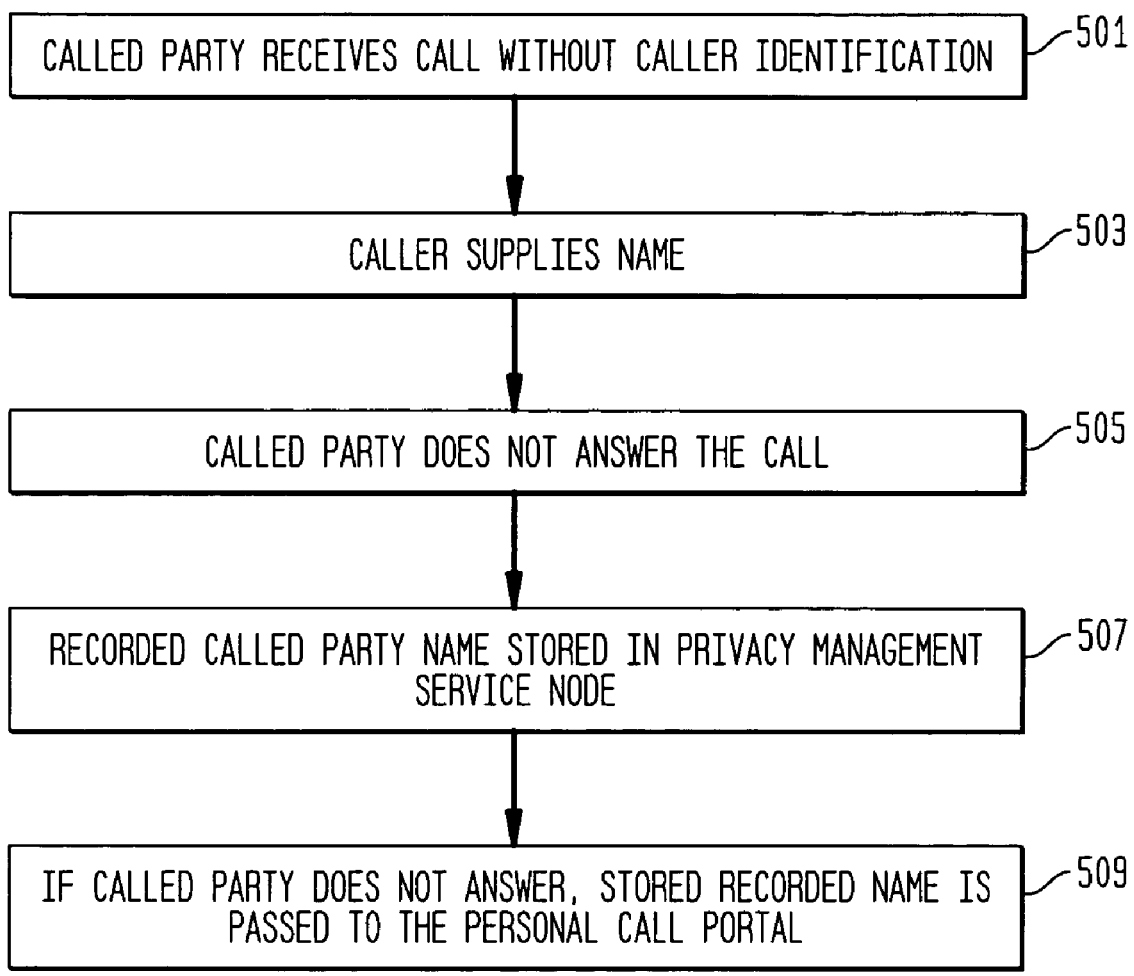
FIG. 5 is a flow diagram illustrating the storage of the caller's identification.

FIG. 5 illustrates the operation obtaining information about non-completed privacy management calls. A called party receives a call missing caller identification (action block 501). The caller supplies his/her name (action block 503). The called party does not answer the call (action block 505). This may be because the called party is unavailable, chooses not to answer, or is busy and does not choose to answer a call waiting call). The calling party supplies a name recording for storage in the privacy management service node (action block 507). When the system detects that the called party is not answering the call, the recorded name is passed to the personal call portal for storage (action block 509). Alternatively, the personal call portal can fetch the name only when the caller retrieves the file of calls. Subsequently, the called party may retrieve data about missed calls or even completed calls by accessing the personal call portal either over the Internet or, if the personal call portal has a voice interface, over the telephone switching network.

The above description is of one preferred embodiment of Applicants' invention. Other embodiments will be apparent to those of ordinary skill in the art without departing from the scope of the invention. The invention is limited only by the attached claims.

We claim:

1. In a telecommunications network a method of completing a call which did not include calling line identification information to a called party which does not accept calls that do not include calling line information, comprising the steps of:

routing said call to a service node having announcement and recording facilities;

from said service node, requesting a caller of said call to speak his or her name;

storing the requested name and a link to call information for said call in a personal call portal unit;

responsive to a first type of request from said called party, providing an indication to a personal computer of said called party indicating that said personal call portal unit has a stored name for a call to said called party;

in response to a second type of request from said personal computer, providing the stored name to said called party;

in response to a third type of request from said called party, accessing said call information via said link from said personal call portal unit;

establishing a connection from said called party to said calling party using said call information; wherein said calling party has a private number and said call is established over said network without revealing said private number to said called party.

2. The method of claim 1 further comprising the steps of:

storing a message from said caller in an answering service; and responsive to a fourth type of request from said called party, connecting said called party to said answering service for retrieving said message left by said caller of said call.

3. A telecommunications network comprising:

means, responsive to reception of a call which does not include calling line information to a called party which does not accept calls which do not include calling line information, for requesting a caller of said call to speak his or her name, and for recording the spoken name; and a personal call portal call unit;

said personal call portal unit comprising;

means for storing the recorded spoken name and for storing a link to information for said call;

means, responsive to a first type of request from a called party of said call, for providing the spoken name to said called party; and means responsive to a second type of request from said called party for requesting establishment of said call using said link to said information for said call;

wherein said calling party has a private number and said call is established over said network without revealing said private number to said called party.

4. The personal call portal Unit of claim 3, further comprising:

a file of name and call information for a plurality of calls to said called party; and means, responsive to a third type of request from said called party, for providing names from said file for said called party; and means responsive to a fourth type of request from said called party for requesting establishment of a call identified by any of the names in said file.

5. The personal call portal unit of claim 3 further comprising:

means, responsive to a fifth type of request from said called party, for connecting said called party to a call answering unit for storing messages from said caller of said call.

* * * * *

UNITED STATES PATENT AND TRADEMARK OFFICE
CERTIFICATE OF CORRECTION

PATENT NO.       : 7,646,860 B2                                         Page 1 of 1
APPLICATION NO.  : 11/137907
DATED            : January 12, 2010
INVENTOR(S)      : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1266 days.

Signed and Sealed this

Twenty-eighth Day of December, 2010

David J. Kappos
*Director of the United States Patent and Trademark Office*